July 5, 1960 W. VERSHOVEN 2,944,116

RECORD-TAPE MUSIC BOX

Filed Sept. 9, 1957 5 Sheets-Sheet 1

Inventor
Wilhelm Vershoven

INVENTOR.
Wilhelm Vershoven

INVENTOR.
Wilhelm Vershoven

INVENTOR.
Wilhelm Vershoven

July 5, 1960 W. VERSHOVEN 2,944,116

RECORD-TAPE MUSIC BOX

Filed Sept. 9, 1957 5 Sheets-Sheet 5

INVENTOR.

Wilhelm Vershoven

United States Patent Office 2,944,116
Patented July 5, 1960

2,944,116

RECORD-TAPE MUSIC BOX

Wilhelm Vershoven, 4 Sedanstr., Essen, Germany

Filed September 9, 1957, Ser. No. 682,902
Claims priority, application Germany Sept. 19, 1956
17 Claims. (Cl. 179—100.1)

This invention relates to music boxes for the selective play back of sound records which are recorded on a record tape after throw-in of a coin, and has for its object to improve such apparatus with respect to their reliability, the number of the sound pieces placed on the record tape, the possibility of preselection of sound pieces during the play back of a previously selected sound piece, the application of remote selector stands, the changing-over to recording and play-back work as well as with respect to an easy service.

While music boxes equipped with record discs are known, which are able to reproduce up to 200 pieces of music, up to now no record-tape apparatus have been in public use, with which a similar large number of sound pieces have been joined on one record tape, since with the constructions proposed for this purpose in many cases already after a short period of working large shifts of the tape occur so that the record played back does not conform with that one which has been selected. Besides this the proposed constructions suffer from further disadvantages and difficulties, in particular the total number of the selectable sound pieces which can be obtained with them in practice is too low.

In order to eliminate these disadvantages, according to the invention, one or more hundred of sound pieces are contained in one single tape and disposed in ten or a multiple of ten tracks, which are subdivided into ten or less sections each, wherein one record is allotted to each section of each track. One transducer head is provided for each ten tracks and the selection of each record is performed in such a manner that after a coin has been thrown in, by a first turning of a selection dial, the transducer head is transversely moved with respect to the tracks and by a second turning of the selection dial the tape is adjusted with its corresponding section in front of the transducer head by means of short contact strips one being lodged on the tape in the region of each section. The transducer heads provided for the different groups of hundreds are jointly adjusted with respect to the selected track and only the transducer head of the selected group of hundreds is electrically connected.

Furthermore, according to the invention, the tracks of the record tape are designated by a one-placed figure of an order e.g. A to K and the sections of the record tape are designated by a one-placed figure of another order, e.g. 1 to 9, so that each one of hundred sound records of each groups of hundreds is characterized by a two-placed designation, e.g. A5, B9, in accordance with the register of the records and with the marking of the selecting dial. The selection of the group of hundreds is effected by means of coloured actuating keys, the colour of which conforms to the colour of the corresponding part of the register of the records.

For the indication of the piece just played back, according to the invention, an indication device is provided for consisting of two groups of ten lamps each (for the tracks A to K) and ten lamps for the sections ("1" to "0") so that each one of the hundred sound pieces of any group of hundreds is indicated by two lamps while the different groups of hundreds are designated each by a coloured lamp corresponding to the actuating keys, the colour of which conforms with the colour of the concerned group of hundreds in the register.

To avoid a shift of the tape, a follower selector in the form of a rotary switch is provided for, which in accordance with the movement of the tape with respect to the operative positions of the different sections is stepwise turned forward and backward, respectively, by means of the contact strips of the tape and closes the circuit for the stopping of the tape, as soon as the follower selector senses on the section selector released for play back, which in the form of a rotary switch has been prepared by means of impulses effected during the second turning of the selecting dial.

In such a manner the follower selector moves in synchronism with the tape while sensing on the section selector. As soon as it reaches a rotary position which conforms with a position of the section selector adjusted by means of the selecting dial, the forward and backward run respectively of the tape is switched off and the tape is changed over to slow play-back movement.

Besides the section selector a track selector in the form of a rotary switch is provided for which is adjusted to the rotary position corresponding to the selected track A–K by means of impulses effected during the first turning of the selector switch, whereby a corresponding number of impulses is imparted to the lifting magnet, in order to adjust the transducer head to the selected track.

Furthermore, the invention consists therein that for the purpose of preselection of a number of record pieces storage devices are provided for in which the track and section values of the preselected record pieces are stored one after the other, in order to be released for reproduction one after the other when the play back of a record piece has been finished, so that independently of the coordination of the preselected record pieces to the tracks and sections, their play back always takes place in the order of the preselection and the same record piece is played back as often as it has been preselected. In particular, for the purpose of preselection of a certain number of record pieces, besides a first pair of section and track selectors a further number of pairs each consisting of a section and a track selector is provided for, into which the turning impulses corresponding to the preselected record pieces are imposed and stored one after the other, through an allotment selector, while a releasing selector, after finishing of the play back of each sound piece, releases each time that pair of selectors which is associated with the sound piece which is, at the time, in the first place preselected.

Further objects and features of the invention will be apparent from the following description of an embodiment of the invention in the form of a music-box for two hundred record pieces, with which the selection and play back of a different number of record pieces takes place after the throw-in of different coins, up to six record pieces may be preselected, a recording by means of a microphone with subsequent play-back (recording-play-back) may take place and remote control stands with coin slots are installed.

Figure 4:
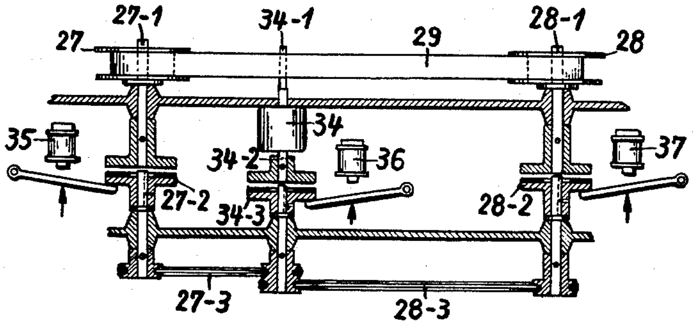

Fig. 4 a side elevation appertaining thereto, partly in section and with the clutch devices.

Figure 5:
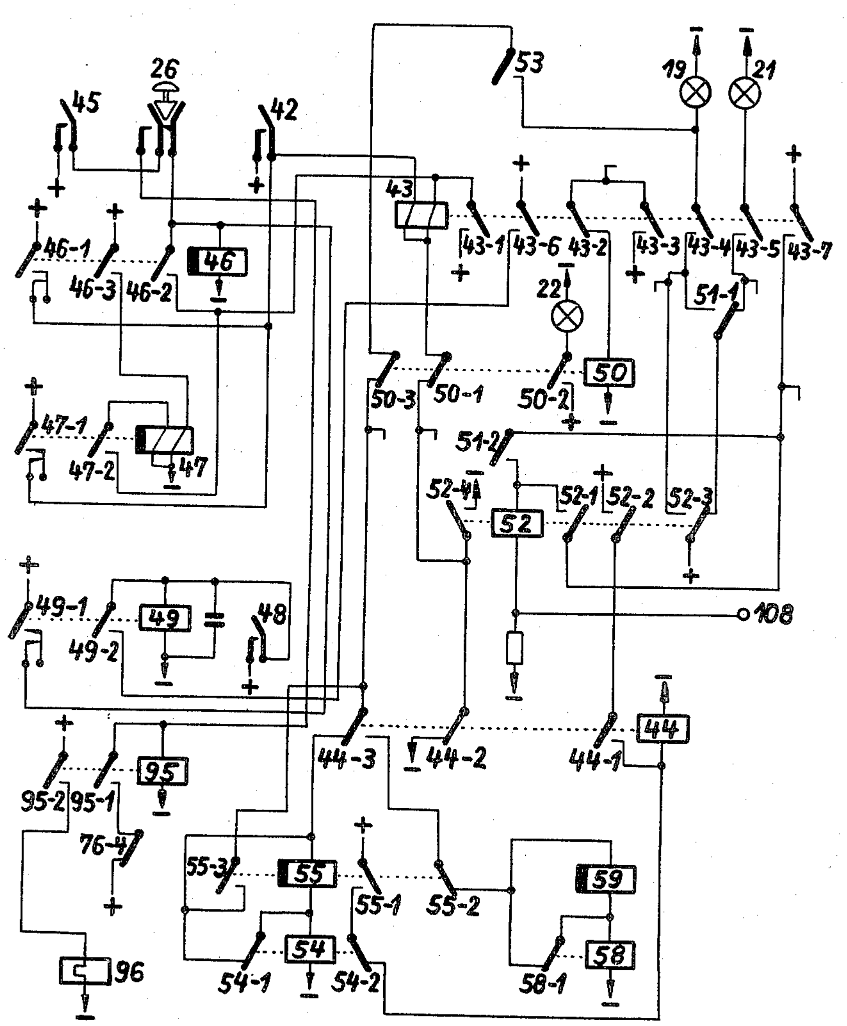

Fig. 5 shows the wiring diagram for putting the apparatus into operation in dependence on the throw-in of different coins.

Fig. 6 shows the total wiring-diagram which, for the purpose of better finding of the different parts, has been subdivided by dash- and dotted-lines into sub-Figures *6a*, *6b*, *6c*, *6d* and *6e* and which, at the top, shows the tape, at the left side of the bottom shows the transducer head lifting device, at the left side of the top the wiring for the recording-play-back, at the right side the main circuit connection wiring, at the right side of the bottom the circuits for the drive couplings of the tape and in the middle portion the section selector, the follower selector, the track selector, and at the right side thereof, the release selector, and at the left side thereof the allotment selector.

In the following, at first, the general design of the apparatus and its main functions shall be described briefly.

*General structure*

The represented music-box has the shape of a round desk (Fig. 1) and is covered by a rockable and removable cover 1. Below the upper dome shaped and transparent part the cover 2 of which is made of plastics, the record tape drive is arranged in visible manner. In its front portion the desk-shaped part contains the operating board 3 which is represented in an enlarged scale in Fig. 2, and beside the same the fields 4 which are determined for the register, i.e. for the list of the record pieces recorded on the tape as well as of the track and section designations thereof. The lower circumferential face is subdivided into several fields which can be opened and which preferably consist of translucent plastics. Behind the wall of the front field coloured vacuum tube lamps are arranged which are switched on and put into rotation when the apparatus is switched on. In three of the other fields loud-speakers 5 are lodged.

Figure 1:
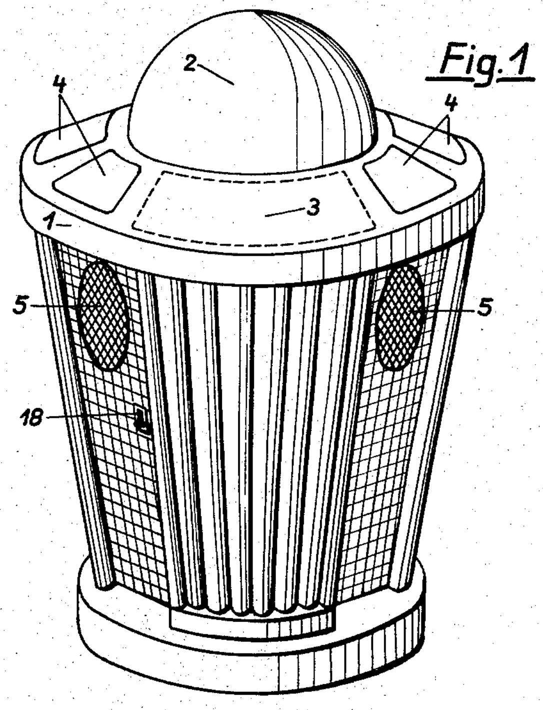
Fig. 1 is a diagrammatic general view of the music-box.

The operating field 3 (Fig. 2) contains the coin slot 6 which is adapted for the throw in of coins of different size. At the left side the selecting dial 7 is to be found which can be drawn into ten different positions and which is provided with a figure and a letter designation for each position. At the right side the microphone 8 is arranged which serves for the recording of sound pieces, announcements or the like for the purpose of subsequent reproduction (recording-play-back). In the middle portion below the coin slot the indicating device 9 is arranged which has a series 11 for the ten lamps "1" to "0" of the section indication and a series 12 of ten lamps for the indication of the tracks A–K. At the left side of the coin slot a signal lamp 13 is provided for the first hundred of record pieces with an actuating key 14 therebelow, while at the right side a lamp 15 and below the same an actuating key 16 for the second hundred of record pieces is arranged. At the left side at the bottom beside the indicating device 9 there is the coin return button 17. The return of the coins takes place through the return trap 18 (Fig. 1). Above the return button 17 three luminous fields 19, 21, 22 are provided for which bear the inscriptions "Please select," "Please do not select" and "Please do not throw in," while at the right side three further luminous fields 23, 24, 25 are arranged with the inscriptions "Recording," "Recording occupied" and "Play back," which are determined for the process of "recording-play-back." This process is initiated by pushing the recording key 26 which is arranged below the luminous fields 23, 24, 25. The meaning of these luminous fields will be explained hereinbelow.

Figure 3:
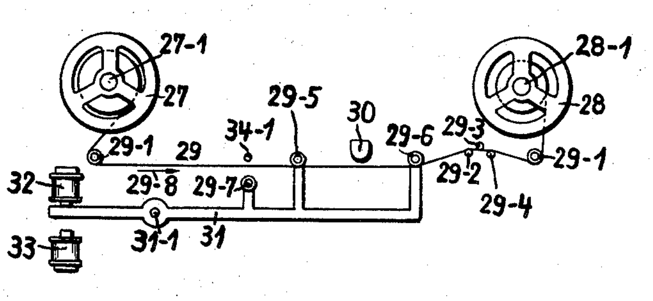
Fig. 3 is a diagrammatic representation of the tape-drive in plane view.

The tape driving mechanism which is diagrammatically represented in Figs. 3 and 4 consists of the two tape reels 27, 28, the tape 29, and the two turning rollers 29–1. It is guided between three contact bolts 29–2, 29–3, 29–4, which cooperate with contact strips arranged on the tape, which will be described more fully hereinbelow. The pick up of the sound takes place by means of the transducer-head 30, from which the tape can be lifted by means of lifting rollers 29–5 and 29–6 and onto which it can be pressed by means of a backing roller 29–7. The rolls are mounted on an actuating lever 31 which is pivoted about a pin 31–1 and which is rocked in the one or the other direction by electro magnets 32, 33.

The drive coupling and actuating mechanisms provided for the quick forward and backward movement of the tape to the selected section and for the play back movement are the usual ones. When the lever 31 is turned counter clockwise by the electro magnet 33 the tape is pressed against a continuation 34–1 of the axis 34–2 of the tape driving roller 34 of small diameter by means of the tape driving motor 29–7 which is mounted on the actuating lever 31. Thereby the slow play-back movement of the tape in the sense of the arrow 29–8 is effected. At the same time the tape is brought into the play-back position with respect to the transducer head 30. For the quick forward run in order to adjust the section the axis 28–1 of the tape reel 28 is rotated with the motor axis 34–2 by means of a clutch 28–2 actuated by an electro magnet 37 (Fig. 4) and a separating clutch 34–3 actuated by an electromagnet 36, and a belt drive 28–3, while for the purpose of backward run of the record tape the axis 27–1 of the other tape reel 27 is connected through a clutch 27–2 actuated by an electro magnet 35, and a corresponding belt drive 27–3 with the motor axis 34–2 for reversed rotation.

In Fig. 6 a record tape 29 for ten tracks A–K and a non-played track "0" is shown which cooperate with the hereinbefore mentioned contact bolts 29–2, 29–3 and 29–4 by means of contact strips arranged at the backside. At the beginning of each of the ten sections of the tape a small contact strip "1" to "10" 29–9 (Fig. 6 at the top) is provided for at the back side of the tape, which during the quick forward run of the tape turn the follower selector by one step in forward direction and during the backward run by one step in backward direction, so that the follower selector runs always in synchronism with the tape. If for any reason the position of the follower selector should not conform with the position of the tape, e.g. after the insertion of a new tape, the follower selector can be brought into conformity with the position of the tape by operating it in forward or backward direction by means of a particular adjustment device which will be described hereinbelow.

At the end of each section small contact strips 29–10 with the designation "1*a*" to "10*a*" are provided for which switch off the movement of the tape after the concerned record has been played back. If however, further records are preselected, the quick run for the adjustment of the next record is switched on.

Figures 6A, 6B:
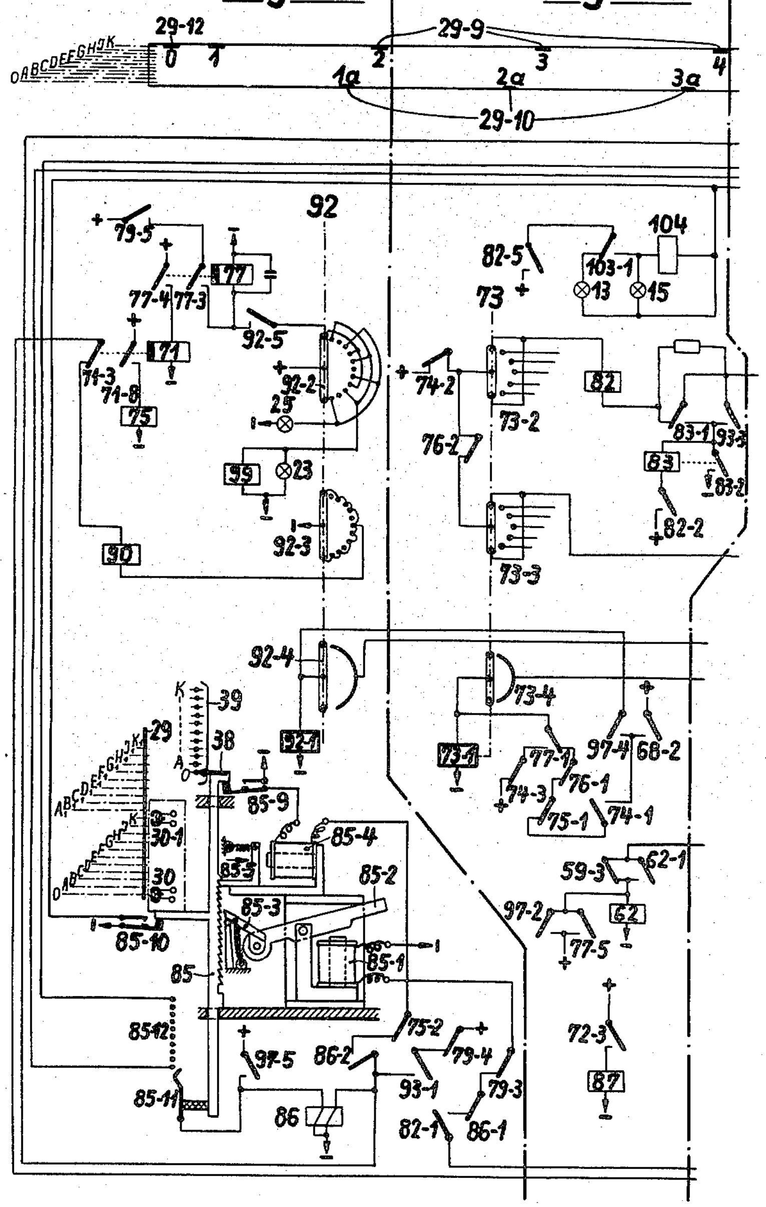

For the track "0" which is determined for the recording play back only two additional contact strips 29–11 (designated on the tape by "11" and "12") are necessary which serve for the search after the section 10 of the tape. In section 10 that part of the track "0" is positioned which is determined for the recording-play-back. Furthermore the contact strips "11" and "12" serve for the control of the transport for the recording, for rewinding in quick run, for the transport of the play back and for the erasure of the track. The contact strips control the recording play-back-selector 92 (Fig. 6*a* at the top).

At the beginning and at the end of the tape one contact strip 29–12 each is provided for (on the tape, Fig. 6, designated by "0" and "13") by which the movement of the tape is changed over into the opposite direction.

Accordingly the record tape has only twenty-four contact strips. Herewith it is of no importance whether the tape is adapted for the play back of one or of several hundreds of record pieces. With more than one hundred of record pieces it is formed so wide that it is able to take up two or more groups of tracks A–K, A1 to K1, A2 to K2 . . . .

The search for the selected sections 1 to 10 takes place in quick run. As the tape, however, must have a length only adapted for ten record pieces the running time required therefor is extremely short. The time for running in backward direction is still shortened in that the follower selector is provided with particular backward run contacts which will be described hereinbelow, and which enable, that the tape can be adjusted also immediately during the backward run to a preselected record piece, if the same is arranged on the tape preceding the played one.

Instead by means of contact strips the sensing of the tape could also be effected by means of photo-electric means. For this purpose the tape could perforated or could be made transparent at the spots in question, e.g. by removing of the emulsion of the tape. For the lifting of the transducer head or heads into the selected track A–K only a fraction of a second is necessary. The running time remains the same no matter whether the apparatus is adapted for one or more hundreds of record pieces.

Figure 2:
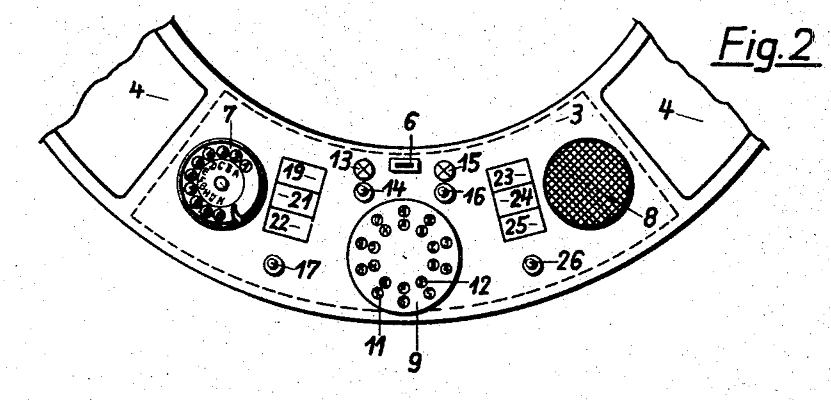
Fig. 2 shows the operating board of the same.

The record tape has large figures "1" to "10" printed thereon which designate the sections, each of which is adapted for a duration of play back of about three minutes. These designation by figures is repeated within the concerned section in distances of about half a meter, whereby it is possible easily to recognize in which section the play back is just taking place. A pointer 38 rigidly connected to the transducer head carrier (Fig. 6*a* at the bottom) which plays over a scale 29 (A–K) indicates the track which is just being played back. By these means the indication of the selected record piece can take place mechanically instead of or beside the electrical indicating device 9 (Fig. 2).

As it has been already mentioned, for each hundred of record pieces one transducer head is necessary. In their positions of rest the transducer heads are adjusted to their tracks "0," K, K1, K2, etc. By means of a lifting magnet 85–1 (Fig. 6*a* at the bottom), they are stepwise lifted to the selected track within a fraction of a second. It has also been mentioned hereinbefore that only that transducer head is connected to the play back circuit the group of hundreds of which has been selected in the manner hereinbefore described. During the quick forward and backward run the record tape is lifted from the transducer heads and from the erasing head.

The key 14 alloted to the first group of hundred is designed as a blank key so that, if actuating of one of the selecting keys for the groups of hundreds is forgotten, in spite of this, one record piece is played back, namely that one of the first group of hundreds and the coin thrown in does not get lost.

Figures 6C, 6D, 6E:
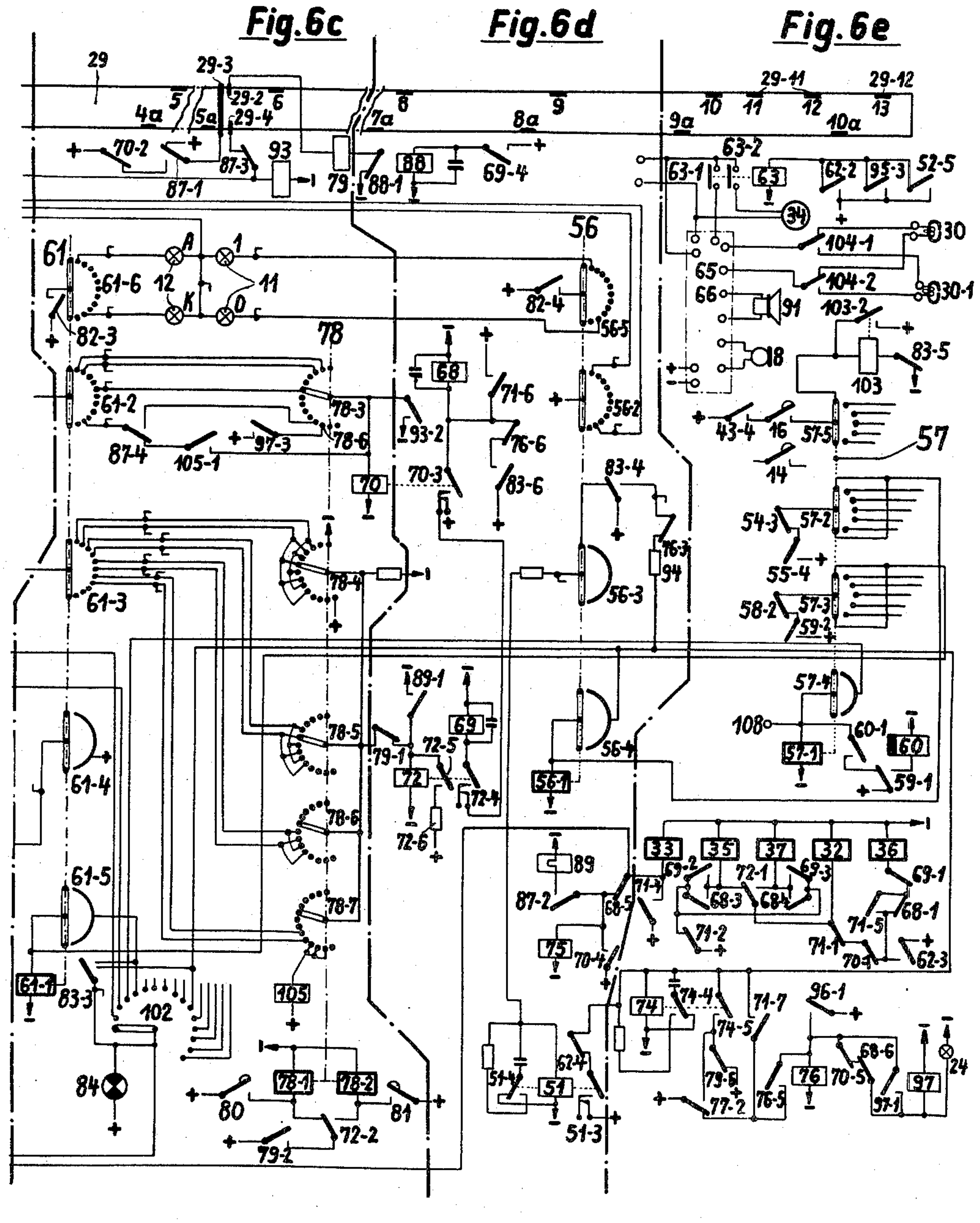

The follower selector which is controlled by the contact strips of the record tape is shown in Fig. 6*c* and designated by the reference numeral 78. It is provided with five contact arms. The above mentioned section selector 61 (Fig. 6*c*) controlling the movement of the tape is provided with five contact arms as well. The track selector 56 (Fig. 6*d*) has four contact arms. It controls the adjustment of the transducing head or heads 30, 30–1 (Fig. 6*a* at the bottom) by means of the transducer head lifting device 85.

Besides the pair of section-track-selectors 61, 56 represented in Fig. 6*c* and 6*d*, the described embodiment contains five further pairs of this kind which are to be thought to lie above the plane of the drawing, and which shall be intimated by the flags attached to the wires issuing from the contacts of these selectors. With the aid of these six pairs of section-track-selectors 61, 56 a preselection of up to six or five record pieces can be made before or during the playing back of a record piece. The allotment of the selected record pieces to the above mentioned section track selectors takes place in the cyclical order of these selector pairs by means of an allotment selector 57 (Fig. 6*e*) as far as the section track selectors are free.

The playing back of the preselected record pieces stored in the section track-selector pairs is controlled by a releasing selector 73 (Fig. 6*b*) which is provided with three contact arms. The playing back takes place corresponding to the order of the selection of the concerned record pieces, as soon as the preceding record piece has been played. For the recording-play-back the recording-play-back selector 92 is provided for, which is represented in Fig. 6*a* at the top and equipped with three contact arms.

The circuit is designed in such a manner that the music-box represented in Fig. 1 can be operated not only by means of the operating boards 3 (Fig. 2) with which it is provided, but also by further remote selection stands which may be situated in any distance whatsoever, without, however, offering the possibility of recording-play-back. For this purpose the said remote selection stands are provided with operating boards 3–1, 3–2, not shown, which are connected with the main apparatus through appropriate wiring, with which, however, the elements 8, 23, 24, 25, 26 are missing.

The coin control of the apparatus is designed in such a manner that upon throw in of 2×0.10 DM one record piece, 1×0.50 DM three record pieces and 1 DM six record pieces are played back, while upon throwing in of 0.50 DM and at the same time pressing the recording key 26 (Fig. 2) the apparatus is prepared for recording-play back.

Before describing the occurring electric switching operations in a detailed manner, in the following the operation and the general function of the music box is described in a summarized manner.

*Coin throw-in*

Upon throwing-in of a coin into the coin slot 6 (Fig. 2) on the luminous field 19 of the appertaining board 3 the inscription "Please select" appears, while in all other operating boards the luminous field 22 "Please do not throw in" will flash up, until the number of record pieces corresponding to the value of the money has been preselected.

As soon as all preselector pairs 56, 61 are occupied, upon the throwing in of any further coin, "Please do not select" appears within the luminous field 21 of the associated operating board. In all other operating boards the inscription "Please do not throw in" appears within the luminous field 22.

As soon as the record piece has been finished, the signal "Please do not select" extinguishes and the signal "Please select" flashes up.

Upon the flashing up of the signal "Please select" the selecting dial 7 is to be actuated by first selecting the letter (A–K) and then selecting the figure ("1" to "0"). If 0.50 DM had been thrown in the selecting dial is to be operated three times, upon throwing in one DM, it is to be operated six times in the same manner, if not in the meantime the signal "Please do not select" appears in the case that the preselector pairs are occupied. Then the preselection can not be carried on before the signal "Please select" flashes up again.

For a recording-play back which can only take place at the main apparatus, simultaneously with the throw in of 0.50 DM the recording key 26 (Fig. 2) must be pushed so long until in the luminous field 24 the inscription "Recording occupied" appears. This "occupied" indication is retained until the play back has been effected. As soon as the inscription "Recording" appears in the luminous field 23 the recording by means of the microphone 8 can be effected. Subsequently after the length of the tape provided for the recording has passed the luminous field 23 "Recording" extinguishes and the rewinding i.e. the backward movement of the tape takes place automatically until the beginning of the record lies in front of the transducer head.

During the subsequent play back the luminous field "Play back" flashes up. The erasure of the reproduced record is effected in well known manner in connection with the next recording.

*Selection dial*

By virtue of the decimal arrangement of the record pieces on the record tape and the simultaneous lifting of all transducer heads to the selected tracks, the selection of a record piece of any group of hundreds can be effected by twice turning the selection dial. If the record piece that is to be selected is contained in the second or a further group of hundreds, the corresponding actuating key is to be pushed before, whereby only the appertaining transducer head is switched on.

*Indicating device*

The letter-figure-designation of each played record piece flashes up in the indicating device 9 (Fig. 2) during the play back of the piece as well as the signal lamp 13, 15 (Fig. 2) associated to the first, second etc. group of hundreds, the actuating key 14 or 16, respectively, of which has been pushed. Besides the indicating device 9 or instead of the same an accordingly enlarged indicating device can be provided for, which may be arranged in the room, in such a manner, that it is visible in the distance. In this way by two or three lamps, respectively, every piece of the register of records consisting of several hundreds of record pieces can be indicated in a definite manner. By the mechanical indicating device hereinbefore described in the form of the pointer arrangement 38, 39 (Fig. 6*a* of the bottom) and the large figures sectionwise printed on the record tape the played piece can be mechanically indicated simultaneously with or instead of the electrical indicating device.

*Selection of record piece*

As long as one of the selector pairs 61, 56 (Figs. 6*c*, 6*b*) is adjusted to one record piece the play back of the next preselected record piece is effected in self-acting manner after the play back of one record piece has been finished. During this time three selector pairs can be adjusted to new record pieces which are to be selected by means of the selecting dial. The allotment of the record pieces selected by means of the selection dial into the selector pairs which have become free takes place by means of the allotment selector 57 (Fig. 6*e*), in such a manner, that at any time that selector pair which has become free in the first place, is adjusted to the newly selected record piece. The releasing of the record pieces stored in the preselector pairs is effected by the releasing selector 73 (Fig. 6*b*), in such a manner, that always that one of the stored record pieces is released which has been selected in the first place. From this it will apparent, that the record pieces are always released in the same order in which they have been selected and that it is also possible, that a record piece in the correct order is played several times if it has been selected several times.

*Electrical wiring*

In the following the electrical switching operations shall be described in detail which occur when the music box is put into operation. In the Figs. 5 and 6 the circuit is thought to be currentless and all elements are in the disposition which they occupy in the position of rest of the music box. The follower selector 78 (Fig. 6*c*) takes the position 5 corresponding to the represented position of the tape 29.

*Putting the music box into operation*

Upon connection to the main circuit the rectifier 66 (Fig. 6*e*) produces a direct current of 60 volts.

The relay 51 (Fig. 6*d*, right side at the bottom), attracts through the arms 56–3 of the track selector 56 and the contacts 83–4 (+, 83–4, 56–3, 51, —). The branch 107 leads to all of the contact arms 56–3 of the other five track selectors 56, so that relay 51 holds off only then if all tracks selectors are occupied. In this case the contact 51–1 indicates that all preselector pairs are occupied, as will be described in detail hereinbelow. Contact 51–3 gives an impulse to relay 74 (+, 51–3, 62–4, 74, —). This one holds itself through its contact 74–5 (+, 79–6, 74–5, 74, —). Contact 74–2 prevents a sensing of the follower selector 78 so that the coin throw-in can begin.

*Coin throw-in*

After 2×0.10 DM have been thrown in, coin contact 42 (Fig. 5) gives an impulse to the selection relay 43. This one holds itself through its second winding by its contact 43–1 and releases the selection of a record piece. After the selection has been effected relay 43 is separated by contact 44–2.

After throw in of 0.50 DM coin contact 45 (Fig. 5) gives an impulse to relay 46. This one gives by means of contact 46–1 the first impulse to the selection relay 43 which holds itself as described before. Relay 46 holds itself through 46–2 and 43–1. Contact 46–3 switches on relay 47 which holds itself by means of its second winding through contact 47–2 and contact 43–1. After the first second piece has been selected contact 43–1 separates the holding off time delayed relay 46, contact 46–1 giving again a second impulse to the selector relay 43. After the selection of the second record piece contact 43–1 separates the highly holding off time delayed relay 47, contact 47–1 giving the third impulse to relay 43.

After throwing in of 1 DM coin contact 48 gives an impulse to relay 49 which holds itself through contact 49–2 and contact 43–6. This one gives an impulse to relay 46 by means of contact 49–1 whereby in the same manner as has been described in connection with the throw in of 0.50 DM the selecting relay 43 releases three times the selection of a record piece. After the third holding off of relay 43 also the highly holding off time delayed relay 49 holds off by the opening of contact 43–6. The relay on holding off, gives again an impulse to relay 46 by means of its contact 49–1, whereby relay 43 agains releases this selection three times.

*Remote selection*

With the connection of remote selectors, for each remote selector the same arrangement as has been described above under item "Coin-throw-in" is necessary, namely the relay 43, 46, 47 and 49. The connection wirings for the remote selectors are intimated by flags at several wirings of Fig. 5. Besides this one blocking relay 50 (Fig. 5) must be added to each selector. Upon throw in of coins these relays are switched on by contact 43–3. Said blocking relay however where the throw in of the coins takes place, is not switched on because here the contact 43–2 separates. The other blocking relays separate by their contacts 50–1 their selecting relays 43 so that all coin contacts and selection dials are switched off and by contact 50–2 the luminous fields 22 "Please do not throw in" are switched on. At the selection dial not blocked the luminous field 19 "Please select" is switched on by contact 43–4, until a number of record pieces corresponding to the coins throw in has been selected. If all preselector pairs are occupied relay 51 (Fig. 6*d* at the bottom) holds off and by means of its contact 51–1 (Fig. 5) and contact 43–5 (Fig. 5) switches on the luminous fields 21 "Please do not select" until the next record piece has been finished. A contact 43–7 switches on relay 52 through contact 51–2. This one holds itself through its contacts 52–1.

*Selection*

By the first turning of the selection dial contact 53 (Fig. 5 at the top) closes and relay 54 attracts. (+, 52–3, 43–4, 53, 50–3, 44–3, 54–1, 54, —.) By opening of contact 54–1 relay 55 attracts in series with relay 54. As relay 55 has holding off time delay and contact 55–3 bridges over the contact 44–3 relay 55 remains attracted during the course of the first series of impulses while relay 54 gets the impulses. By contact 54–2 relay 44 attracts upon the first impulse of relay 54. Relay 44 holds itself through contact 52–2 and its contact 44–1. Through contact 54–3 (Fig. 6*e*) the impulse are given to the turning magnet 56–1 (Fig. 6*d*) of the track selector 56 (+, 55–4, 54–3, 57–2, 56–1, —). The track selector 56 (Fig. 6*d*) turns its arms 56–2 to 56–5 in accordance with the given impulses. After the last impulse the selection dial contact 53 (Fig. 5) opens, whereby relays 54 and 55 hold off. By the second turning the selection dial contact 53 closes. As contact 44–3 has changed over, now relay 58 (Fig. 5) attracts. (+, 52–3, 43–4, 53, 50–3, 44–3, 55–2, 58–1, 58, —.) By opening of contact 58–1 relay 59 attracts in series with relay 58. As relay 59 has holding off time delay, it remains attracted during the course of the second series of impulses while relay 58 gets the impulses. Relay 60 (Fig. 6*e*) attracts through contact 59–1. Through contact 58–2 (Fig. 6*e* middle portion) the impulses are given to the turning magnet 61–1 (Fig. 6*c* at the bottom) of the section selector 61 (+, 59–2, 58–2, 57–3, 61–1, —). The section selector 61 returns its arms 61–2 to 61–6 according to the selected figure. After the series of impulses relay 59 (Fig. 5) holds off with time delay and separates relay 60 by means of contact 59–1 (Fig. 6*e*). This one has also time delay, whereby the turning magnet 57–1 of the allotment selector 57 gets an impulse and adjusts its contact arms 57–2 to 57–5 to the next selector pair.

By turning in of the section selector 61 (Fig. 6*c*) the contact arm 61–4 of the same connects the relay 62 (Fig. 6*b*) to plus (+, 61–4, 59–3, 62, —). Relay 62 holds itself through its contact 62–1 until all section selectors 61 (Fig. 6*c*) are returned into their zero position. Contact 62–2 (Fig. 6*e*) takes over the holding for relay 63 which keeps the motor 34 and the amplifier 65 still switched on. The motor clutch 36, the forward run clutch 35 and the magnet coil 32 are switched on by contact 62–3 (Fig. 6*e*), so that the tape runs forward with high speed.

(+, 62–3, 68–1, 69–1, 36, —)
(+, 62–3, 70–1, 71–1, 32, —)
(+, 62–3, 70–1, 71–1, 72–1, 35, —)

*Release of the track and section selector*

Upon the first turning of the selection dial contact 53 in Fig. 5 is closed whereby contact 54–3 (Fig. 6*e*) is opened and contact 55–4 is closed. Upon the first return of the selection dial contact 54–3 gives impulses to the turning magnet 56–1 (Fig. 6*d*) of the track selector in accordance with the turned number. The track selector turns its contact arms in accordance with the given impulses. Upon the second turning of the selector dial contact 58–2 (Fig. 6*e*) opens and closes contact 59–2.

On the second return of the selection dial a contact 58–2 gives impulses to the turning magnet 61–1 (Fig. 6*c*) of the section selector 61 in accordance with the turned number. The section selector turns its contact arms by the same number of impulses.

During the second turning of the selecting dial contact 59–1 (Fig. 6*e*) was changed over and relay 60 attracted, which closes its contact 60–1. Contact 59–1 now separates relay 60. As this one has a holding off time delay the turning magnet 57–1 gets an impulse whereby the contact arms 57–2 to 57–5 of the allotment selector 57 are adjusted to the next preselector pair, so that the next record piece can be preselected until all preselector pairs are occupied. The contact arm 61–3 (Fig. 6*c*) of the section selector 61 rests on the first contact of the contact bank 73–3 (Fig. 6*b*) of the releasing selector 73. The next section selector rests on the second contact of 73–3 etc.

After each piece of music the turning magnet 73–1 of the releasing selector 73 gets an impulse through 68–2, 74–1, 75–1, 76–1 and 77–1 and turns its contact arms 73–2 to 73–4 to the next preselector pair.

In that the allotment selector 57 (Fig. 6*e*) is advanced by one step after each allotment of a preselector pair and the releasing selector 73 (Fig. 6*b*) does the same after each record piece, it is made sure, that the releasing of the selector pairs takes place in the sequence of their selection.

*Follower selector*

The follower selector 78 (Fig. 6*c*) is a step by step actuating mechanism with a turning magnet 78–1 for the forward run and a turning magnet 78–2 for the backward run. It has five switching banks the contact arms 78–3 to 78–7 of which are jointly turned forward or backward.

During the forward run of the tape the contact 72–2 is connected with the forward run turning magnet 78–1 and during the backward run it is connected with backward run turning magnet 78–2. The contact strips 1–13, 29–9, 29–11, 29–12 (Fig. 6 at the top) lodged on the record tape give an impulse to relay 79 when passing the contact bolts 29–2 and 29–3. The relay 79 energizes by means of its contact 79–2 (Fig. 6*c* at the bottom) during the forward run the turning magnet 78–1 and during the backward run the turning magnet 78–2. Contact 79–6 (Fig. 6*e* at the bottom) separates relay 74 upon the first attracting of relay 79 (Fig. 6*c* at the top). Thereby the follower selector runs always synchronously with the section division of the record tape.

On a dial-plate not shown the position of the follower selector is to be recognized. After the insertion of a new record tape the follower selector is to be adjusted to the same figure of the record tape by means of a forward run key 80 (Fig. 6*c* at the bottom) or a backward run key 81.

*Control of the follower selector in forward run*

After the release of a pair of the preselectors 56, 61 (Fig. 6*d*, 6*c*) the record tape 29 (Fig. 6 at the top) runs forward in quick run. If the figure of the selected record piece is positioned in the direction of the forward run, the follower selector 78 (Fig. 6*c*) senses on the released section selector 61 by means of its contact arm 78–3, whereby the relays 70 and 82 (Fig. 6*b*) attract (+, 74–2, 73–2, 82, 83–1, 61–2, 78–3, 70, —). In this way the magnet for reeling 32 (Fig. 6*e* at the bottom) is switched off and the transporting magnet 33 is switched on.

At the same time, relay 82 (Fig. 6*b*) gives impulses to the lifting magnet 85–1 (Fig. 6*a* at the bottom) of the transducer head lifting device 85 by its contact 82–1 (Fig. 6*a*) through an interrupter 84 (Fig. 6*c*).

(+, 84, 82–1, 86–1, 79–3, 85–1, —)

The lifting magnet 85–1 lifts the transducer head lifting device 85 by its armature 85–2 and by means of its pushing pawl 85–3. The transducer head glides with its contact spring 85–11 over a contact bank 85–12. These ten contacts lead to the ten contacts of the contact bank 56–2 (Fig. 6*d*) of the track selector 56. As soon as the contact spring 85–11 (Fig. 6*a*) has found the selected track of the track selector 56, relay 86 attracts.

(+, 56–2, 85–12, 85–11, —)

By its contact 86–1 relay 86 switches off the lifting magnet 85–1. Along with the transducer head lifting device the transducer head 30 and 30–1 is lifted to the selected track at the same time.

*Control of the follower selector in backward run*

If now a section will be selected which precedes the last played section, e.g. if section 5 has been played and section 1 is being selected, the contact bolts 29–3 and 29–2 are situated between the figures 5*a* and 6 of the record tape 29. As soon as the record tape 29 has been released its contact strip 6 passes the contact bolts 29–3 and 29–2 in quick run. Thereby the tape gives an impulse to relay 79 (Fig. 6c at the top).

(+, 87–1, 29–3, 29–2, 79, 88–1, —)

Contact 79–2 (Fig. 6c at the bottom) gives an impulse to the forward run magnet 78–1 of the follower selector 78 (+, 79–2, 72–2, 78–1, —), which turns its contact arms 78–3 to 7 by one step from 5 to 6. Then its contact arm 78–4 senses on the sixth step, which is positioned on the first step of the figure selecting arm 61–3 and effects attraction of relay 72 (Fig. 6d).

(+, 74–2, 76–2, 73–3, 61–3, 78–4, 79–1, 72, —)

The relay 72 (Fig. 6d) holds itself through contacts 72–5 (+, 72–6, 72–5, 72, —).

Contact 72–3 (Fig. 6b at the bottom) switches on relay 87 (+, 72–3, 87, —). Contact 87–2 (Fig. 6d) prepares the thermo-relay 89. Contact 72–2 (Fig. 6c at the bottom) changes the follower selector 78 (Fig. 6c) over from forward run magnet 78–1 to backward run magnet 78–2. Contact 72–4 (Fig. 6d) gives an impulse to the braking relay 69 (+, 70–3, 72–4, 69, —) which, for a short time, switches off the magnet for the motor clutch 36 (Fig. 6e) by contact 69–1 (Fig. 6e) and switches on by contact 69–2 (Fig. 6e) the forward run clutch 35 and by contact 69–3 the backward run clutch 37, whereby the record tape is stopped at once.

(+, 71–2, 69–2, 35, —) (+, 71–2, 69–3, 37, —)

Contact 72–1 (Fig. 6d) switches off the forward run clutch and switches on the backward run clutch (+, 62–3, 70–1, 71–1, 72–1, 37, —). The changing over to the backward run of the record tape takes place immediately after the contact making of the contact strip 6 (Fig. 6 at the top). During the backward run, the strip 6 is not allowed to give an impulse to the follower selector. The suppression of such impulse is effected by contact 69–4 (Fig. 6d at the top) which switches on relay 88 (+, 69–4, 88, —). This one holds itself for a short time after the holding off of relay 69 (Fig. 6d middle portion) by means of the condenser connected in parallel. By these means contact 88–1 (Fig. 6d at the top) prevents an attraction of the impulse relay 79 (Fig. 6c) so that in spite of the double passage of the contact strip 6 only one impulse is given to the follower selector.

The sensing on the selected figure is effected with the backward run in the same manner as it has been described with the forward run.

*Play back of the selected record piece*

By sensing on of the follower selector 78 (Fig. 6c) the relays 70 and 82 (Fig. 6d) attract (+, 74–2, 73–2, 82, 83–1, 61–2, 78–3, 70, —). Contact 70–3 (Fig. 6d) gives an impulse to relay 68 which has a comparatively long holding off time delay by means of the condenser connected in parallel (+, 70–3, 68, —).

Contact 70–4 switches on the thermo-relay 89 (+, 70–4, 87–2, 89, —). After a short time contact 89–1 short circuits relay 72 so that this one holds off . Contact 72–3 (Fig. 6d) switches off relay 87. Contact 87–2 (Fig. 6d) switches off the thermo-relay 89. Relay 68 (Fig. 6d) effects the stop of the record tape 29 in that it switches off the motor clutch 36 (Fig. 6e) for a short time by contact 68–1 and switches on the forward run clutch by contact 68–3 and the backward run clutch 37 by contact 68–4.

(+, 71–2, 68–3, 35, —) (+, 71–2, 68–4, 37, —)

At the same time, by opening of contact 68–5 (Fig. 6d) an attraction of the transporting magnet 33 is prevented and the relay 90 (Fig. 6a) for the switching on of the loudspeaker 91 (Fig. 6) is opened.

After the holding off of relay 68 (Fig. 6d) the forward run clutch 35 and the backward run clutch 37 are switched off. Contact 68–1 (Fig. 6e) switches on the motor clutch 36 (+, 62–3, 68–1, 69–1, 36, —). Contact 68–5 (Fig. 6d) switches on the transport magnet 33 (+, 70–4, 68–5, 33, —). In addition contact 68–5 (Fig. 6a) switches on the relay 90 (Fig. 6a) for the switching on of the loudspeaker 91 (Fig. 6e) (+, 70–4, 68–5, 71–3, 90, 92–3, —).

Now the play back of the record piece takes place. The amplifiers 65 necessary therefor which have already been switched on by relay 63 (Fig. 6e) through contact 63–1 for the purpose of preheating when a coin had been thrown in, are not described in detail.

*The finishing of the play back of the record piece*

If a record piece is being played within section "1" and the tape reaches with its contact strips "1a" the contact bolts 29–3 and 29–4, relay 93 (Fig. 6c) is switched on (+, 87–1, 29–3, 29–4, 87–3, 93, —).

Relay 93 holds itself through contact 93–1 (Fig. 6a at the bottom) (+, 79–4, 93–1, 93, —).

Contact 93–1 switches on the releasing magnet 85–4 of the transducer head lifting device 85 so that this one returns into its position of rest thereby opening the foot contact 85–9 (+, 79–4, 93–1, 86–2, 75–2, 85–4, 85–9, —). Contact 93–1 continues to hold relay 86 in order to make sure that the transducer head lifting device 85 returns into its zero position prior to the opening of contact 86–2 (+, 79–4, 93–1, 86, —). Contact 93–2 (Fig. 6d) bridges over relay 70 (Fig. 6c) which switches off the transport 33 (Fig. 6e) and the loud-speaker relay 90 (Fig. 6a) by holding off of its contact 70–4 (Fig. 6d). Contact 70–3 (Fig. 6d middle portion) gives an impulse to relay 68 which, for a short time, switches off the motor clutch 36 by contact 68–1 (Fig. 6e) and switches on the forward run clutch 35 by contact 68–3 and the backward run clutch 37 by contact 68–4 whereby the record tape is suddenly stopped.

Contact 93–3 (Fig. 6b) switches on relay 83. (+, 82–2, 83, 93–3, 61–2, 78–3, 93–2, —). Relay 83 holds itself through contact 83–2 (+, 82–2, 83, 83–2, —). Contact 83–3 (Fig. 6c) gives impulses to the turning magnet 56–1 (Fig. 6d) of the track selector 56 through an interrupter 84 and to the turning magnet 61–1 (Fig. 6c) of the section selector 61 so that these ones return into their zero position.

(+, 84, 83–3, 56–4, 56–1, —)
(+, 84, 83–3, 61–5, 61–1, —)

Contact 83–4 (Fig. 6d) effects time delayed attraction of relay 74 (Fig. 6e) through resistance 94 (Fig. 6d) (+, 83–4, 76–3, 94, 74, —).

The attraction time delay of relay 74 is necessary in order to make sure that at first the track selector 56 (Fig. 6d) and the section selector 61 (Fig. 6e) return into their zero positions before the release selector comes into operation.

Subsequently a contact 74–1 (Fig. 6b) closes whereby the turning magnet 73–1 of the release selector 73 makes one step, as contact 68–2 is still closed (+, 68–2, 74–1, 75–1, 76–1, 77–1, 73–1, —). Thereby the contact arms of the releasing selector 73 are changed over to the next preselector pair, the relays 82 and 83 holding off at the same time.

*Recording-play-back*

Upon throw in of 0.50 DM and at the same time pushing down the "Recording"-key 26 (Fig. 2, 5) the coin contact 45 (Fig. 5) gives an impulse to relay 95 (+, 45, 26, 95, —). Relay 95 holds itself through 95–1 (+, 76–4, 95–1, 95, —). Contact 95–2 switches on thermo-relay 96 (+, 95–2, 96, —). Contact 95–3 (Fig. 6e at the top) switches on relay 63 (+, 95–3, 63, —). Contact 63–1 switches on the amplifier 65. Contact 63–2 switches on the motor 34. Contact 96–1 (Fig. 6e at the bottom) switches on relay 76 and if no record piece is being played back, also 97 (+, 96–1, 76, —) (+, 96–1, 68–6, 70–5, 97, —). Relay 76 holds itself through contact 76–5 (+, 77–2, 76–5, 76, —). Relay 97 holds itself through contact 97–1 and contact 76–5 (+, 77–2, 76–5, 97–1, 97, —).

At the same time within the luminous field 24 "Recording occupied" flashes up. Contact 97–2 (Fig. 6b) switches on relay 62 (+, 97–2, 62, —) which further on keeps the amplifier and the motor switched on. Contact 62–3 (Fig. 6e) switches on the motor clutch 36, the forward run clutch 35, and the reeling magnet 32. Contact 76–4 (Fig. 5) switches off relay 95.

(+, 62–3, 68–1, 69–1, 36, —)
(+, 62–3, 70–1, 71–1, 32, —)
(+, 62–3, 70–1, 71–1, 72–1, 35, —)

The record tape now runs in quick run up to the contact strip "11" (Fig. 6 at the top). The follower selector 78 (Fig. 6c) running synchronously therewith senses on plus by its contact arm 78–3 through contact 78–6 and contact 97–3 so that relay 70 attracts (+, 97–3, 78–6, 78–3, 70, —). Relay 70 now effects the further switching operation in the same manner as with the play back of the record piece. Besides this contact 68–2 (Fig. 6b) gives an impulse to the turning magnet 92–1 (Fig. 6a) of the recording-play back selector 92 (+, 68–2, 97–4, 92–1, —). This one turns its contact arms 92–2 to 4 by one step in forward direction. A contact arm 92–3 switches off the loudspeaker relay 90, in order to cause the loud-speakers to be switched off during the recording. Contact arm 92–2 switches on relay 99 and the luminous field 23 "Recording" (+, 92–2, 99, —) (+, 92–2, 23, —).

Relay 99 (Fig. 6a) changes the transducer head 30 (Fig. 6e at the top) over from play back to recording so that the recording can take place by means of a microphone 8 (Fig. 2).

*End of the recording*

At the end of the recording contact strip 12 (Fig. 6 at the top) switches on relay 79 (+, 87–1, 29–3, "12," 29–2, 79, 88–1, —). Relay 79 gives an impulse to the forward run magnet 78–1 of the follower selector 78 by contact 79–2 (Fig. 6c of the bottom) (+, 79–2, 72–2, 78–1, —). This one turns its contact arms from contact '11" to '12." Hereby relay 70 holds off.

Contact 70–3 (Fig. 6d) gives an impulse to relay 68 which for a short time switches off the motor clutch 36 by contact 68–1 (Fig. 6c) and switches on the forward run clutch 35 by contact 68–3 and the backward run clutch by contact 68–4, whereby the tape is suddenly stopped. Contact 68–2 (Fig. 6b) gives a second impulse to turning magnet 92–1 (Fig. 6a) of the recording-play back selector 92 (+, 68–2, 97–4, 92–1, —). This one turns its contact arms 92–2 to 4 by one step. Contact arm 92–2 switches off relay 99 and the luminous field 23 "Recording." After the holding off of relay 68 (Fig. 6d) the record tape runs forward in quick run in the manner hereinbefore described until the contact strip "13" bridges over the contact bolts 29–3 and 29–2. The follower selector 78 (Fig. 6c) turns by one step in forward direction to contact 13. The contact arm 78–4 effects attraction of relay 72 (Fig. 6d) (+, 78–4, 79–1, 72, —). This one holds itself through contact 72–5 (+, 72–6, 72–5, 72, —). Contact 72–2 (Fig. 6c) changes the follower selector 78 over from the forward run magnet 78–1 to the backward run magnet 78–2. Contact 72–4 (Fig. 6d) gives an impulse to the braking relay 69 (+, 70–3, 72–4, 69, —) which for a short time switches off the motor clutch 36 by contact 69–1 (Fig. 6e) and the forward run clutch 35 by contact 69–2 and the backward run clutch 37 by contact 69–3 whereby the record tape is suddenly stopped.

(+, 71–2, 69–2, 35, —) (+, 71–2, 69–3, 37, —)

Contact 72–1 (Fig. 6e) switches off the forward run clutch and switches on the backward run clutch (+, 62–3, 70–1, 71–1, 72–1, 37, —). The changing over to the backward run of the record takes place immediately after the contact making of one of the contact strips "0"–"13." During the backward run this one is not allowed to give an impulse to the follower selector. The suppression of this impulse is effected by means of contact 69–4 (Fig. 6d) which switches on relay 88 (+, 69–4, 88, —). Relay 88 holds itself for a short time after relay 69 has held off by virtue of the condensor connected in parallel thereto. Thereby contact 88–1 prevents attraction of the impulse relay 79 (Fig. 6c) so that in spite of the double passage of the contact strips one impulse only is given to the follower selector. The backward run of the record tape takes place until the follower selector has run to the eleventh contact. Herewith relay 70 (Fig. 6c) attracts and the play back is effected in the same manner as the play back of a record piece. Contact 68–2 (Fig. 6b) gives the third impulse to the turning magnet 92–1 (Fig. 6a) of the recording play back selector 92, the contact arm 92–2 of which switches on the luminous field 25 "Play back of Recording" (+, 92–2, 25, —).

*End of the recording-play-back*

At the end of the play back the contact strip "12" effects that the follower selector 78 (Fig. 6c) turns from contact "11" to "12." Therewith by contact arm 78–3 relay 70 holds off. Contact 70–3 (Fig. 6d) gives an impulse to relay 68 which gives its fourth impulse to the recording-play back selector so that this one is again positioned in its position of rest.

Through the contact arm 92–2 and the head contact 92–5 relay 77 gets an impulse (+, 92–2, 92–5, 77, —). This relay holds itself and switches on relay 71 (+, 77–4, 71, —) which bridges over the just opened contact 68–5 (Fig. 6d) by contact 71–4 (Fig. 6e), so that the transport is continued. By contact 71–5 (Fig. 6e) it bridges over the just opened contact 68–1 (Fig. 6e), so that the motor clutch remains switched on until the contact strip "12" has totally passed the contact bolts 29–3 and 29–2. Hereby relay 79 (Fig. 6c), relay 77 (Fig. 6a), and relay 71 holds off and the tape stops.

*Return switch*

The turning magnets of the allotment selector 57 (Fig. 6e), of the releasing selector 73 (Fig. 6b), of the recording play back selector 92 (Fig. 6a), of the six track selectors 56 (Fig. 6d) and of the six section selectors 61 (Fig. 6c) are connected with a rotary switch 102 (Fig. 6c), the switch arm of which is connected to an interrupter 84. By stepwise rotation of the hand operative switch the turning magnets connected thereto get impulses through the interrupter 84 until the rotary selectors have reached their position of rest. In this way after such a revision of the music box or with the insertion of a new record tape all selectors are brought into their zero position by one single turning of the return switch.

*Indicating device*

By the provision of letters A–K and figures 1–0 on the selection dial the just played piece of a group of hundred can be indicated on an indicating device by means of ten lamps A–K and ten lamps "1" to "0." For this purpose each track selector 56 (Fig. 6d) has an additional contact bank 56–5 and each section selector 61 (Fig. 6c) a contact bank 61–6 to which the twenty indicating lamps are connected. In spite of the occupation of all track and section selectors by preselecting only the lamps of the released track and section selector and the lamp of the selected group of hundreds are indicated. Through the contacts 82–3 (Fig. 6c) 82–4 (Fig. 6d) and 82–5 (Fig. 6b) the switching on of the three lamps is prepared. It is effected by the contact 85–10 not before the transducer head lifting device 85 (Fig. 6a) has been lifted.

*The selection of the first or the second group of hundreds*

Before the selection the key 14 or 16 of the desired group of hundreds is to be pushed. Only then the desired record piece within the concerned group of hundreds is to be selected by means of the selection dial.

After throw-in of a coin into the music-box itself a contact 43–4 (Fig. 6*e*) closes. If a record piece within the first hundred is desired, key 14 is to be pushed, which does not cause any switching operation. After the selecting and the release of the record piece the transducer head lifting device 85 (Fig. 6*a*) is lifted whereby contact 85–10 is closed and the lamp 13 (Fig. 6*b*) of the first group of hundreds is switched on (+, 82–5, 103–1, 13, 85–10, –). The transducer head changing over relay 104 (Fig. 6*b*) is not energized herewith so that the transducer head 30 (Fig. 6*e*) is connected through the contacts 104–1 and 104–2 to the entrance of the amplifier 65.

If a record piece is desired of the second hundred key 16 is to be pushed. Relay 103 attracts through the contact arm 57–5 of the allotment selector (+, 43–4, 16, 57–5, 103, 83–5, –). Relay 103 holds itself through contact 103–2 (+, 103–2, 103, 83–5, –). Contact 103–1 (Fig. 6*b*) prepares the lamp 15 of the second hundred and the changing over relay 104 for the transducer head which are switched on after the release of the record piece by contact 82–5 (+, 82–5, 103–1, 104 or 15, 85–10, –). The changing over relay 104 for the transducer head changes over the entrance of the amplifier 65 from the transducer head 30 to the transducer head 30–1 by means of its contact 104–1 (Fig. 6*e*) and 104–2. At the end of the record piece contact 83–5 separates relay 103. The hundreds keys 14 and 16 in the remote selectors effect the same switching operation through their contacts 43–4 (Fig. 5).

As has been noted hereinbefore under item "General Structure" the section 10 of the tape is provided in the same manner as the other sections, with the contacts for stopping, the tape at the beginning and at the end of the section for the playing back of permanently recorded sound pieces (contacts "10" "10*a*"). Besides this, between the same, additional contacts 11 and 12 (29–11) are provided for the control of the temporary recording with subsequent play back. In order to make sure that on the play back of a permanently recorded record piece of section 10 the piece is not switched off by the contact strips "11" and "12" (Fig. 6*e* at the bottom) means are provided for by which the contacts "11" and "12" are made ineffective during the play back of a permanently recorded piece in section 10. For this purpose, the tenth and the twelfth contact of the contact bank 78–7 (Fig. 6*c* at the bottom) of the follower selector are connected with each other, so that on the passage of the contact strips 29–11 (Fig. 6*e* at the top) through the contact bolts 29–3, 29–2 (Fig. 6*c* at the top) the relay 105 (Fig. 6*c* at the bottom) remains switched on and contact 105–1 (Fig. 6*c* at the top) keeps relay 105 switched on. In this way the tape is not switched off by the contact strips 29–11 but only by contact strip "10*a*."

What I claim is:

1. In a music box of the class described, a tape, a tranducer head cooperating therewith, a group of a certain number of tracks longitudinally arranged side by side on the tape, each destined for a number of sound records to be played back by means of said transducer head, means for transversely moving said transducer head with respect to said tape for adjusting the transducer head to anyone of said tracks, said tape being subdivided in longitudinal direction into a certain number of sections each destined for one sound piece in each track, means for longitudinally moving said tape in the one or the other direction adapted to adjust anyone of its sections in front of the transducer head, a selection dial turnable into a certain number of turn positions each allotted to one of said tracks and to one of said sections, operative connecting means between said transversely moving means and said selection dial adapted to adjust, by a first turning of said selection dial, the transducer head to the track corresponding to the drawn turn position of said dial, and operative connecting means between said longitudinally moving means and said selection dial adapted to adjust, by a second turning of said selection dial, the section of the tape corresponding to the drawn turn position of said dial in front of the transducer head, whereby anyone of the recorded sound records can be selected by two turnings of said selection dial.

2. In an apparatus according to claim 1, further groups of tracks arranged side by side of said first group of the tape, further transducer heads, one associated with each of said further groups of tracks, all of said transducer heads being positively connected with each other, whereby upon transversely and longitudinally moving them relatively to said tape they are adjusted all to the sound records of the different groups in the selected section according to the two turnings of the selection dial, respectively, a number of group setting means each associated to one of said groups of tracks, and means for making effective only that transducer head for playing back the group setting means of which has been operated, whereby anyone of the sound pieces of several groups of tracks can be selected by three selecting operations.

3. In an apparatus according to claim 1, an indicating device for the sound records just played-back, comprising a first set of lamps each being allotted to one of said tracks, a second set of lamps each being allotted to one of said sections of the tape, switching means for each lamp, operative connections between said selection dial and said lamp switching means adapted to switch on, upon the two turnings of said dial, the two lamps corresponding to the selected track and section, respectively.

4. In an apparatus according to claim 1, further groups of tracks on said tape, further transducer heads, one associated to each of said further groups, a number of group setting means each associated with one of said groups of tracks, a number of differently coloured lamps each allotted to one of said groups, switching means for each lamp, operative connecting means between said switching means and said group setting means adapted to switch on the lamp allotted to the selected group, a register of the sound records of the tape having divisions corresponding to the records in the different groups of tracks, each division being coloured in conformity with the colour of the allotted lamp.

5. In an apparatus according to claim 1, an indicating device for the sound record just played back consisting of a pointer positively connected with said transducer head, a scale having a series of signs allotted each to one of said tracks, whereby on adjusting the transducer head to a track, said pointer will be adjusted to the corresponding sign, a series of large signs on the tape for indicating said sections of the tape, each sections having several equal signs in spaced relation, the signs of the just played back section being free to be inspected.

6. In an apparatus according to claim 1, sensing means cooperating with said tape, a number of means to be sensed on said tape, one being provided for each section, a stepwise movable follower selector, operative connections between said follower selector, said sensing means and said means to be sensed adapted to move the following selector by one step each time the means to be sensed associated with the following section passes said sensing means, said operative connecting means between said longitudinally moving means and said selection dial comprising: a section selector in the shape of a rotary switch adapted to be adjusted according to the impulses effected during the second turning of the selection dial, stopping means for stopping the tape, operative connections between said follower selector, said section selector sensing means, said means to be sensed and said stopping means adapted to stop the tape when the follower selector and the tape arrive at a position corresponding to the preadjusted position of the section selector.

7. In an apparatus according to claim 1, said connecting means between said transversely moving means for the transducer head comprising a stepwise moved track selector in the form of a rotary switch adjustable to a position corresponding to the track to be selected by means of the impulses effected during the first turning of the selection dial, a shifting mechanism for stepwise shifting the transducer head transversely with respect to the tracks, an interrupter adapted to impart shifting impulses to said shifting mechanism, means for putting into action said interrupter when the tape has reached the section position corresponding to the second turning of the selection dial, and means for putting out of action said interrupter, when the transducer head has reached a position corresponding to the adjusted position of the track selector comprising a contact finger secured to the transducer head and a series of contacts cooperating therewith and connected with said track selector.

8. In an apparatus according to claim 1, means for storing the track and section values of a certain number of sound records comprising a series of track selectors each adapted to receive the track value corresponding to the impulses effected during the first turning of the selection dial, a series of section selectors each adapted to receive the section value corresponding to the impulses effected during the second turning of the selection dial, means for introducing said track and section values into the pairs of track and section selectors in cyclical sequence, and operative connecting means between said track and section selectors and said transversely moving means and said longitudinally moving means, respectively, and means for putting cyclically into action the preselected pairs of track- and section-selectors as soon as the playing back of the preceding sound record has been finished, whereby the play back of the stored sound pieces takes place in the sequence of the preselection and the same sound record is played back as often as it has been preselected.

9. In an apparatus according to claim 1, a series of track selectors, a series of section selectors, each adapted to receive the track and section values, respectively, corresponding to the impulses effected during the first and second turning, respectively, of the selection dial, means for sensing the position of the tape, an allotment selector operatively connected with said track and section selectors, said selection dial and said means for sensing the position of the tape being adapted to introduce the track and section values in a cyclical sequence into said pairs of track and section selectors, one after the other, and a releasing selector, operative connections between said releasing selector, said transversely and longitudinally moving means, and said sensing means adapted to cyclically put into action the preselected pair of track and section selectors as soon as the playback of the preceding sound record has been finished.

10. In an apparatus according to claim 1, means for temporarily recording, playing back and erasing a sound piece after throwing in of a coin, a microphone, operative connections between the microphone and said transducer head adapted to record the sound piece received from the microphone on the tape, means for erasing the recorded sound piece after having been played back, a 0-track for temporary records on said tape besides said group of tracks for permanent records, said means for transversely moving said transducer head being constructed to adjust said transducer head to said 0-track with recording-playing-back and to move it transversely with respect to the tape for adjusting it to one of the constantly recorded tracks, whereby the selectable constant sound records cannot be injured by said erasure means.

11. In an apparatus according to claim 1, an indicating device for the sound records just played back comprising: a first set of lamps each being allotted to one of said tracks, a second set of lamps each being allotted to one of said sections of the tape, said connecting means between said transversely moving means for the transducer head and said longitudinally moving means for said tape comprising pairs of a section selector and a track selector both adapted to be adjusted according the impulses effected during the first and the second turning of the selection dial, respectively, said track and section selectors having particular contact segments, and means for connecting the lamps with said particular contact segments of these pairs of section and track selectors by means of which the longitudinal and transversal movement takes place.

12. In an apparatus according to claim 1, said means for longitudinally moving said tape comprising section contact strips lodged at the beginning of each section, sensing means cooperating with said contact strips of each section a follower selector moved synchronously with the passing of the section contact strips under said sensing means during the forward and backward run by means of the impulses transferred by said contact strips and means for suppressing the impulse appertaining to the first reached contact strip after the changing over from forward run to backward run of the tape.

13. In an apparatus according to claim 1, said means for longitudinally moving said tape comprising section, contact strips lodged at the beginning of each section adapted to initiate the play back movement, stopping means for stopping the tape after the playing back of a record has been finished, a small contact near the end of each section adapted to put into action said stopping means, and means for reversing the direction of movement of the tape, comprising contact strips provided for at the beginning and at the end of the tape.

14. In an apparatus according to claim 1, said means for longitudinally moving said tape comprising section selectors having the form of rotary switches, a follower selector having the form of a rotary switch, means for stopping the tape, means for adjusting said follower selector synchronously with the passing of the sections beneath the transducer head, said section selectors having each a group of contacts, said follower selector comprising four groups of contact arms one for each of the four groups, said groups of contacts of the section selectors are in parts allotted to said four groups in such a manner that one of the said contact arms becomes effective at once and switches said means for stopping after the first step, if the section put into action precedes the section played back at last.

15. In an apparatus according to claim 1, means for putting the selection dial into action in dependence on the throw in of a coin comprising means for making effective three pairs of a first and a second turning of the selection dial for subsequently selecting three sound pieces by means of a coin of certain value, and a setting means adapted to prepare the apparatus for the recording of a not permanently recorded sound piece and for subsequent playing back thereof after the throw in of a coin.

16. In an apparatus according to claim 1, means for temporarily recording a sound piece subsequently playing back and erasing it, a 0-track for temporary records on said tape besides said group of tracks for permanent records, a particular section at the end of the tape including a portion of the 0-track in which the said temporarily recording takes place, and contact strips allotted to said particular section controlling the movement of the tape for said temporarily recording and playing back.

17. In an apparatus according to claim 1, two contact strips in each section of the tape controlling the means for the longitudinal movement of the tape at the beginning and at the end of each section, means for temporarily recording a sound piece, subsequently playing back and erasing it, a 0-track for temporary records on said tape besides said group of tracks for permanent records, a particular section at the end of the tape including a portion of the 0-track in which the said temporarily recording takes place, and additional contact strips allotted to said particular section controlling the movement of the tape for said temporarily recording and playing back, and means for making ineffective said additional contact strips during the play back of a permanent record.

References Cited in the file of this patent

UNITED STATES PATENTS

| | | |
|---|---|---|
| 2,396,409 | Berzer | Mar. 12, 1946 |
| 2,519,725 | White | Aug. 22, 1950 |
| 2,694,110 | Roberts | Nov. 9, 1954 |